United States Patent
Vuppala et al.

(10) Patent No.: US 11,734,397 B2
(45) Date of Patent: Aug. 22, 2023

(54) HALLMARK-BASED IMAGE CAPTURE PREVENTION

(71) Applicant: INTERNATIONAL BUSINESS MACHINES CORPORATION, Armonk, NY (US)

(72) Inventors: Sai Prasanth Vuppala, Visakhapatnam (IN); Phani Kumar V. U. Ayyagari, Hyderabad (IN); Madan K Chukka, Hyderabad (IN); Manish Anand Bhide, Hyderabad (IN); Purnachandra Rao Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 17/457,066

(22) Filed: Dec. 1, 2021

(65) Prior Publication Data
US 2023/0169155 A1  Jun. 1, 2023

(51) Int. Cl.
| | |
|---|---|
| G06F 21/16 | (2013.01) |
| G06T 1/00 | (2006.01) |
| H04N 23/61 | (2023.01) |
| H04N 23/60 | (2023.01) |
| H04N 23/66 | (2023.01) |

(52) U.S. Cl.
CPC .............. *G06F 21/16* (2013.01); *G06T 1/005* (2013.01); *H04N 23/61* (2023.01); *H04N 23/64* (2023.01); *H04N 23/66* (2023.01); *G06F 2221/0737* (2013.01); *G06T 2201/0064* (2013.01)

(58) Field of Classification Search
CPC .............. H04N 7/152; H04N 1/32144; H04N 21/8358; H04N 23/61; H04N 23/66; H04N 23/64; H04L 65/764; H04L 65/765; H04L 65/403; G06F 21/16; G06F 2221/0737; G06T 1/005; G06T 2201/0064

See application file for complete search history.

(56) References Cited

U.S. PATENT DOCUMENTS

| | | | | |
|---|---|---|---|---|
| 7,570,283 B2 * | 8/2009 | Sato | .................. | H04N 1/00281 348/333.12 |
| 7,656,294 B2 * | 2/2010 | Boss | ..................... | H04N 5/772 455/410 |

(Continued)

FOREIGN PATENT DOCUMENTS

WO    2003034320 A1    4/2003

OTHER PUBLICATIONS

Author Unknown, "Instagram will send a notification when you record your screen!", WABetaInfo, Jan. 22, 2018, https://wabetainfo.com/instagram-will-send-a-notification-when-you-record-your-screen/, 5 pages.

(Continued)

*Primary Examiner* — Pritham D Prabhakher
(74) *Attorney, Agent, or Firm* — Caleb D. Wilkes

(57) ABSTRACT

A method, computer system, and a computer program product for image protection are provided. A first device includes a computer and a first camera. The first device identifies a picture that has a hallmark. The first device transmits a message requesting authorization to have a copy of the picture. The message contains data representative of the hallmark. The first device receives a response message. The first device determines whether the response message authorizes capture of a copy of the picture.

20 Claims, 7 Drawing Sheets

(56) References Cited

U.S. PATENT DOCUMENTS

| | | | |
|---|---|---|---|
| 8,429,745 B1* | 4/2013 | Casaburi | G06F 21/554 |
| | | | 726/1 |
| 8,826,452 B1* | 9/2014 | He | G06F 21/84 |
| | | | 726/27 |
| 8,904,473 B2* | 12/2014 | Sambamurthy | H04L 63/083 |
| | | | 726/1 |
| 9,179,058 B1 | 11/2015 | Zeira | |
| 9,189,697 B1* | 11/2015 | Daniel | H04N 21/4223 |
| 9,239,910 B2* | 1/2016 | Kim | G06F 21/10 |
| 9,430,673 B1* | 8/2016 | Bowers | H04N 21/41407 |
| 9,582,482 B1* | 2/2017 | Sharifi | H04W 4/18 |
| 9,684,804 B2 | 6/2017 | Cohen | |
| 10,045,092 B2* | 8/2018 | Deuel | H04N 21/44008 |
| 10,068,071 B2* | 9/2018 | Shaw | H04N 1/32144 |
| 10,419,511 B1* | 9/2019 | Yuan | H04N 7/152 |
| 10,567,661 B2* | 2/2020 | Kim | H04N 23/667 |
| 10,798,294 B1* | 10/2020 | K C | H04L 67/025 |
| 10,949,961 B1* | 3/2021 | Narayanaswamy | G06T 3/4046 |
| 11,281,771 B2* | 3/2022 | Beveridge | G06N 20/00 |
| 2004/0247120 A1* | 12/2004 | Yu | H04N 21/23892 |
| | | | 375/E7.018 |
| 2006/0028558 A1* | 2/2006 | Sato | H04N 23/635 |
| | | | 348/E5.042 |
| 2008/0267614 A1 | 10/2008 | Boss | |
| 2012/0255029 A1* | 10/2012 | Kim | G06F 21/10 |
| | | | 726/26 |
| 2014/0204237 A1* | 7/2014 | Sohn | H04N 1/4486 |
| | | | 348/222.1 |
| 2015/0215492 A1* | 7/2015 | De Vuono | H04N 1/32144 |
| | | | 382/100 |
| 2016/0253508 A1* | 9/2016 | Song | G06F 21/554 |
| | | | 726/29 |
| 2016/0253772 A1* | 9/2016 | Kofod | G06T 1/0021 |
| | | | 382/100 |
| 2017/0017648 A1* | 1/2017 | Pearlman | G06F 16/9566 |
| 2018/0213158 A1* | 7/2018 | Kim | H04N 23/61 |
| 2019/0340475 A1* | 11/2019 | Edwards | B42D 25/30 |

OTHER PUBLICATIONS

Mell et al., "The NIST Definition of Cloud Computing", National Institute of Standards and Technology, Special Publication 800-145, Sep. 2011, pp. 1-7.

Nakamura et al., "Fast Watermark Detection Scheme for Camera-equipped Cellular Phone," ACM Digital Library, MUM 2004: Proceedings of the 3rd international conference on Mobile and ubiquitous multimedia, Oct. 27-29, 2004, https://dl.acm.org/doi/pdf/10.1145/1052380.1052395, pp. 101-108.

* cited by examiner

HALLMARK-BASED IMAGE CAPTURE PREVENTION

BACKGROUND

The present invention relates generally to cameras and to the automated prevention of unauthorized image capture.

SUMMARY

According to one exemplary embodiment, a method for image protection is provided. A first device includes a computer and a first camera. The first device identifies a picture that has a hallmark. The first device transmits a message requesting authorization to have a copy of the picture. The message contains data representative of the hallmark. The first device receives a response message. The first device determines whether the response message authorizes capture of a copy of the picture. A computer system and a computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for image protection. Many images and/or videos are placed online today for digital viewing by others. Many image owners would like to be compensated when others copy and use their images. Other image owners would like their privacy respected and do not want unauthorized strangers to capture and view their photos, show their photos to others, or further distribute their photos to others. Although image downloading may be prohibited by the software of a website displaying the images, viewers may circumvent these prohibitions by capturing a displayed image with their personal camera device, for example, by holding the personal camera device in the vicinity of a computer monitor displaying the image and actuating the image capture feature of the personal camera device when the image displayed on the computer screen is in view of the personal camera device. The present embodiments may help counteract this unauthorized image capture and may lead to greater privacy and copyright protection for owners of images. The present embodiments may thus help camera devices improve, better avoid copyright infringement, and facilitate greater respect for privacy of others.

Figure 1A:
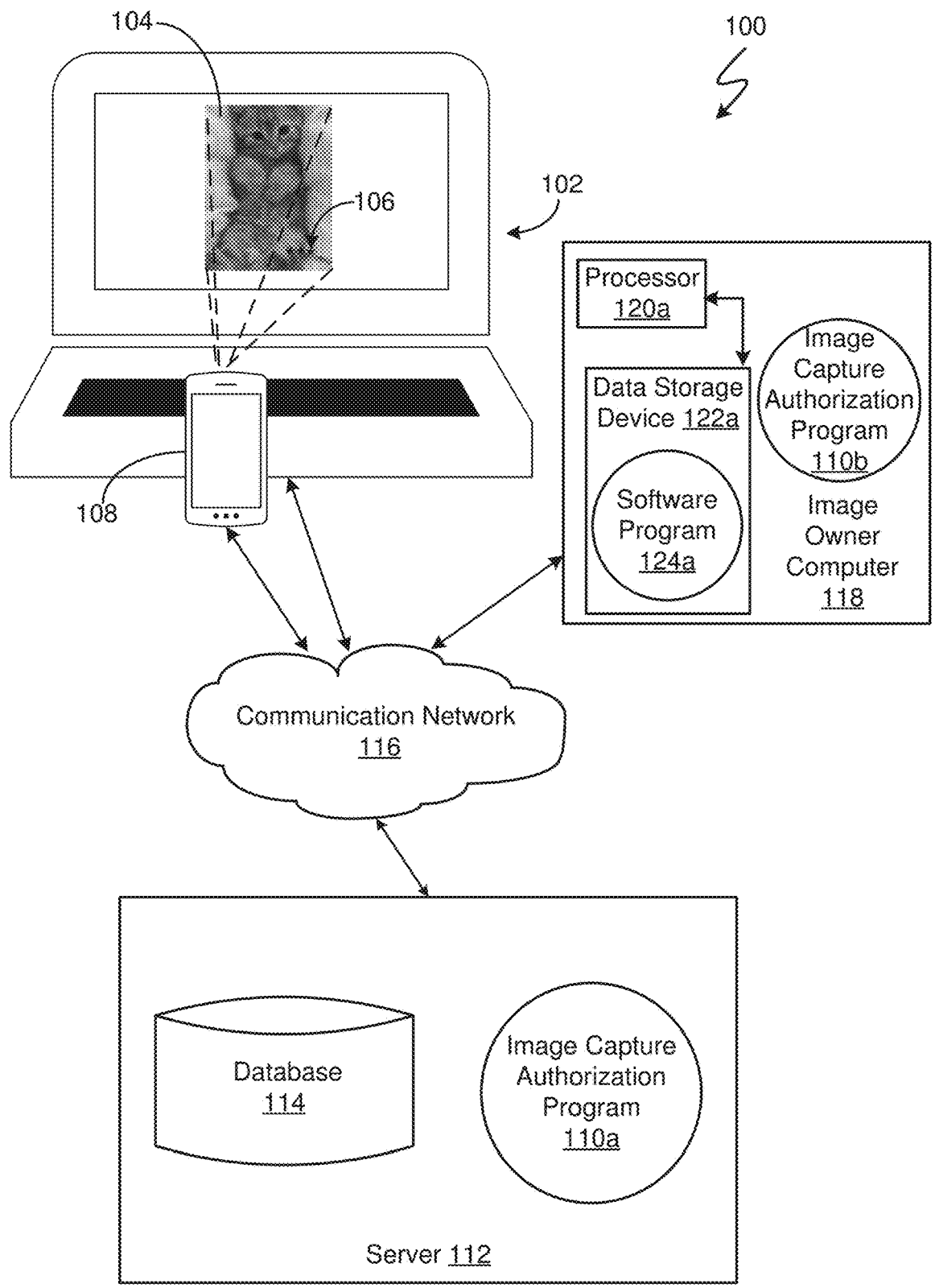
FIG. 1A illustrates a networked computer environment according to at least one embodiment.

Referring to FIG. 1A, a networked computer environment 100 in accordance with one embodiment is depicted. The networked computer environment 100 may include a general computer 102, a personal camera device 108, a server 112, and an image owner computer 118.

The general computer 102 may be a general purpose computer that a user may use to access the internet and visit websites using an internet browser that is being ran by a processor of the general computer 102 so that one or more aspects of the website are displayed on the screen of the general computer 102. The browsing of the websites may include finding photos and/or videos to display that are presented via one or more websites on the internet. FIG. 1A shows that a cat photo 104 is being displayed on a screen/monitor of the general computer 102. This cat photo 104 may become visible when a user uses a web browser of the general computer 102 to visit a website at which the cat photo 104 has been stored by its owner.

For various reasons a person viewing the cat photo 104 on the screen of the general computer 102 may want to make a copy of the cat photo 104. Although in some instances the software of the general computer 102 or software of the website hosting the cat photo 104 may prohibit and prevent a download of the cat photo 104, a person may want to capture a copy of the cat photo 104 by using a separate personal camera device 108 to capture an image of the cat photo 104. This work-around may be carried out via the user performing a traditional aim and click method with their camera. Specifically, a lens of a camera of the personal camera device 108 is brought into the vicinity of the general computer 102 as is shown in FIG. 1A. The personal camera device 108 is pointed at the display screen of the general computer 102 and specifically at the cat photo 104 that is currently being displayed at the display screen of the general computer 102. The user may then press and/or actuate a button of the personal camera device 108 to capture images within the sight of the lens. Some components of the personal camera device 108 are explained in more detail with respect to FIG. 1B including camera 126 which the user may use to capture a copy of the picture, e.g., of the cat photo 104. The camera 126 may be connected to a housing of the personal camera device 108.

The networked computer environment 100 may also include a server 112 that is a computer and that is enabled to run image capture authorization program 110a that may interact with a database 114. The networked computer environment 100 may also include an image owner computer 118. The owner of the cat photo 104 may use their own computer, e.g., the image owner computer 118, to upload the cat photo 104 onto a website of the internet so that others may view the cat photo 104. Others may then view the cat photo 104 by visiting the website, e.g., as is shown in FIG. 1A. A person may control the general computer 102 to view the cat photo 104 at a website. Some websites require registration and then approval of an identity of the person who is browsing before allowing digital content such as photos that are posted on the website to be accessed and viewed. The image owner computer 118 may include a first processor 120a and a first data storage device 122a. The first data storage device 122a stores a first software program 124a. The image owner computer 118 may also have an image capture authorization program 110b stored thereon.

The image owner may use the image owner computer 118 and the first processor 120a thereof to run the first software program 124a and the image capture authorization program 110b. The image owner may also use the image capture authorization program 110b on the image owner computer 118 to register the cat photo 104 with the image capture authorization program 110a, 110b, 110c. This registration may include transmitting a digital copy of the cat photo 104 across the communication network 116 to the image capture authorization program 110a at the server 112. As a result of this registration, the image capture authorization program 110a, 110b may also apply a hallmark onto the copy of the photo that is received. Alternatively, a user may themselves, using their own image processing software, apply a hallmark to their respective photo and then at the time of photo registration inform the image capture authorization program 110a, 110b of the hallmark that was applied.

With this applied hallmark, when the photo is subsequently displayed via the internet the hallmark will be on the photo. Various embodiments of the hallmark may be implemented. In FIG. 1A, the cat photo 104 is shown with a first visible hallmark 106 as a hallmark in a lower right corner of the cat photo 104. In this example, the first visible hallmark 106 is a group of three asterisk symbols ("***") arranged horizontally in a row.

The various computers, e.g., the general computer 102, the personal camera device 108, the server 112, and the image owner computer 118 (and the multiple camera device 128 shown in FIG. 1C) may communicate with each other via a communication network 116. The networked computer environment 100 may include many general computers, many servers, many personal camera devices, and many image owner computers although one general computer 102, one personal camera device 108, one server 112, and one image owner computer 118 are shown in FIG. 1A. The communication network 116 allowing communication between the general computer 102, the personal camera device 108, the server 112, the image owner computer 118 and the multiple camera device 128 may include various types of communication networks, such as the Internet, a wide area network (WAN), a local area network (LAN), a telecommunication network, a wireless network, a public switched telephone network (PTSN) and/or a satellite network.

Figure 1B:
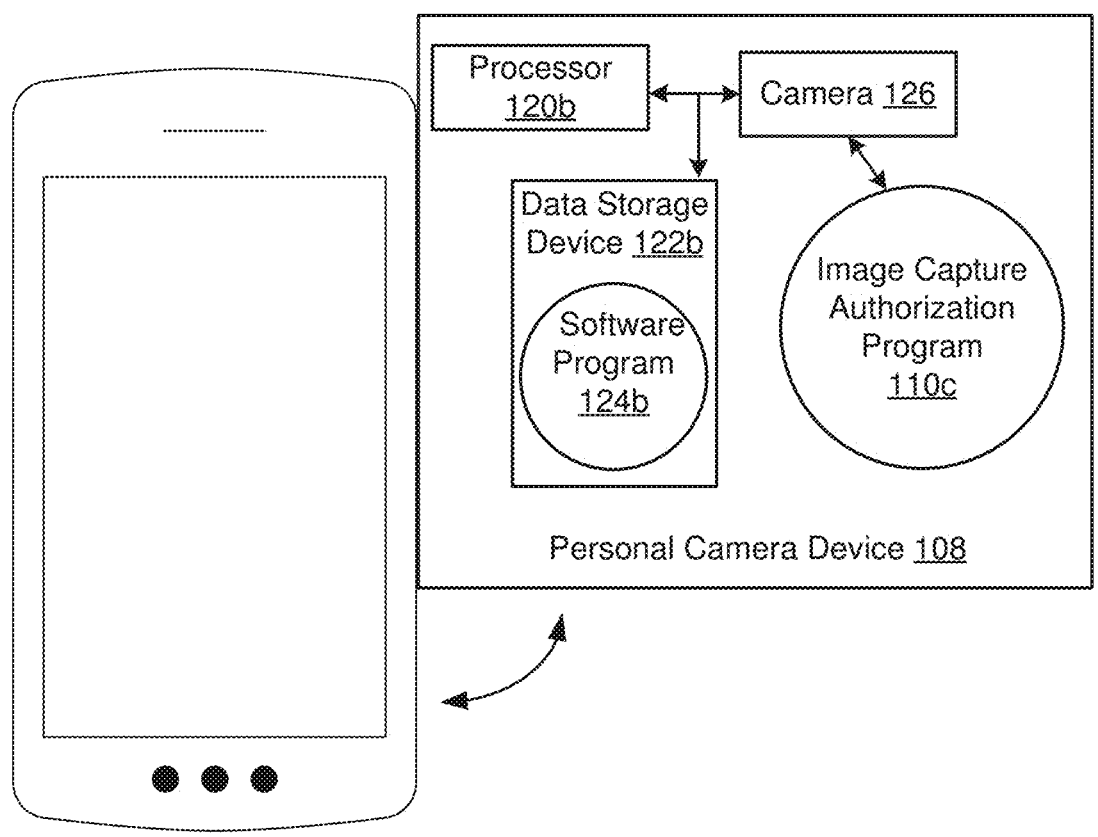
FIG. 1B illustrates some components of the mobile device that is shown in FIG. 1A and that according to at least one embodiment may be used to perform the process shown in FIG. 2.

It should be appreciated that FIGS. 1A and 1B provide only illustration of some implementations and do not imply any limitations with regard to the environments in which different embodiments may be implemented. Many modifications to the depicted environments may be made based on design and implementation requirements.

The general computer 102, the personal camera device 108, the server 112, the image owner computer 118, and the multiple camera device 128 may communicate with each other via the communication network 116. The communication network 116 may include connections, such as wire, wireless communication links, or fiber optic cables. The communication network 116 may itself include multiple servers such as a network edge server and an edge/gateway server which may be enabled to run or assist in operation of the image capture authorization. The communication network 116 may in some embodiments be or include high speed networks such as 4G and 5G networks. Implementing the present image capture authorization embodiments in a 5G network will enable at least some embodiments to be implemented on the edge in order to boost network performance.

Figure 3:
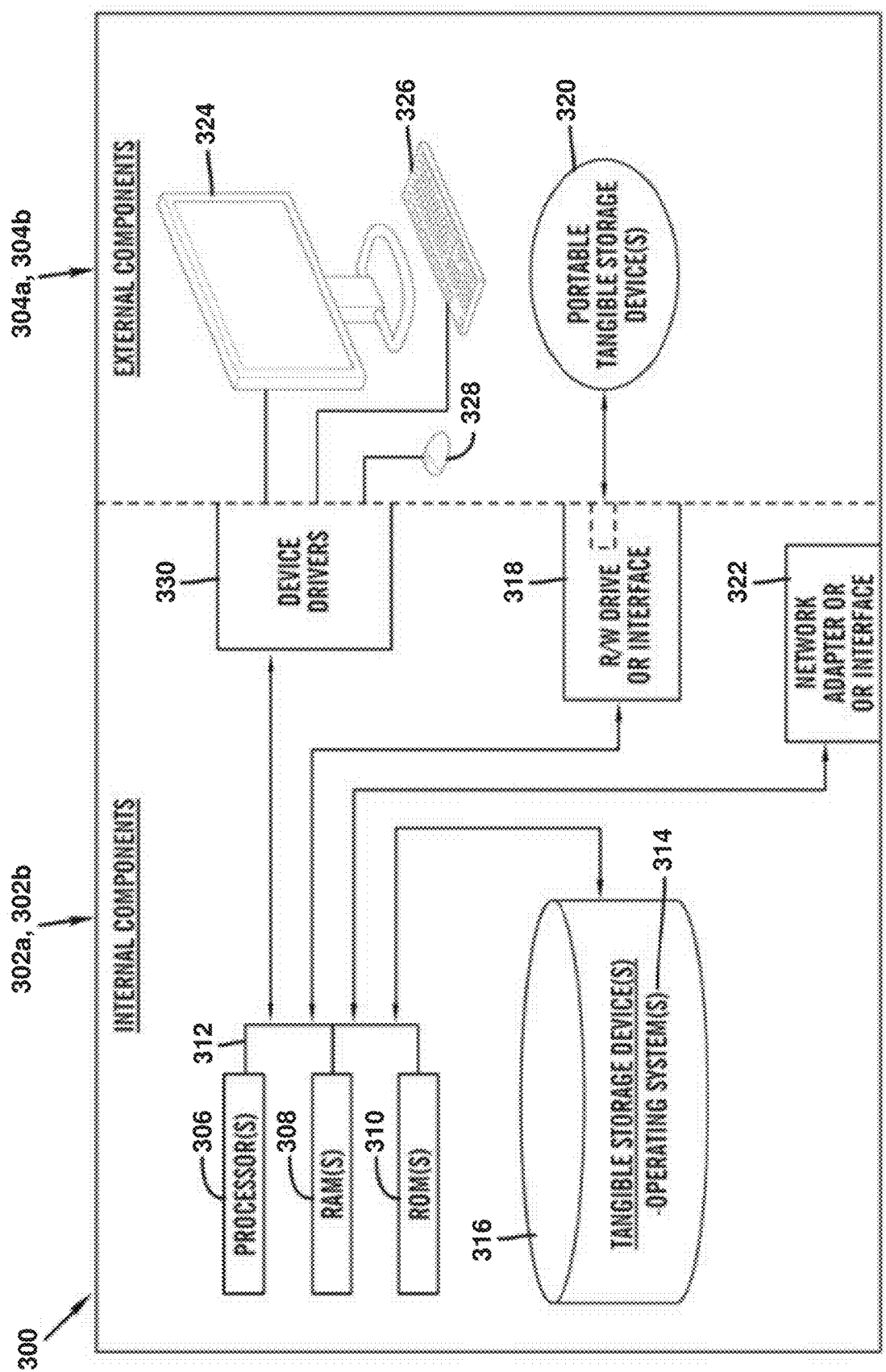
FIG. 3 is a block diagram of internal and external components of computers, mobile devices, and servers depicted in FIGS. 1A and 1B according to at least one embodiment.

As will be discussed with reference to FIG. 3, the server 112 may include internal components 302a and external components 304a, respectively. The general computer 102, the personal camera device 108, the image owner computer 118, and the multiple camera device 128 may also each include internal components 302b and external components 304b as depicted in FIG. 3. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. The general computer 102 and the image owner computer 118 may each be, for example, a mobile device, a telephone, a personal digital assistant, a netbook, a laptop computer, a tablet computer, a desktop computer, or any type of computing device capable of running a program, accessing a network, and accessing a database 114 in a server 112 that is remotely located with respect to the general computer 102 and to the image owner computer 118. The general computer 102, the image owner computer 118 may include a display screen, a speaker, a microphone, a camera, and a keyboard or other input device.

FIG. 1B shows more details about components of the personal camera device 108 that is shown in FIG. 1A. The double arrows in FIG. 1B indicate that the box to the right illustrates some of the interior components of the personal camera device 108 that is shown to the left of FIG. 1B and that is shown in FIG. 1A. The personal camera device 108 may include another processor 120b and another data storage device 122b. The other data storage device 122b may store another software program 124b. The personal camera device 108 may also store the image capture authorization program 110c. A person seeking to use a personal camera to capture a copy of an image being displayed on a computer screen or elsewhere may use the other processor 120b to run the image capture authorization program 110c to check for authorization to capture the image copy.

Figure 1C:
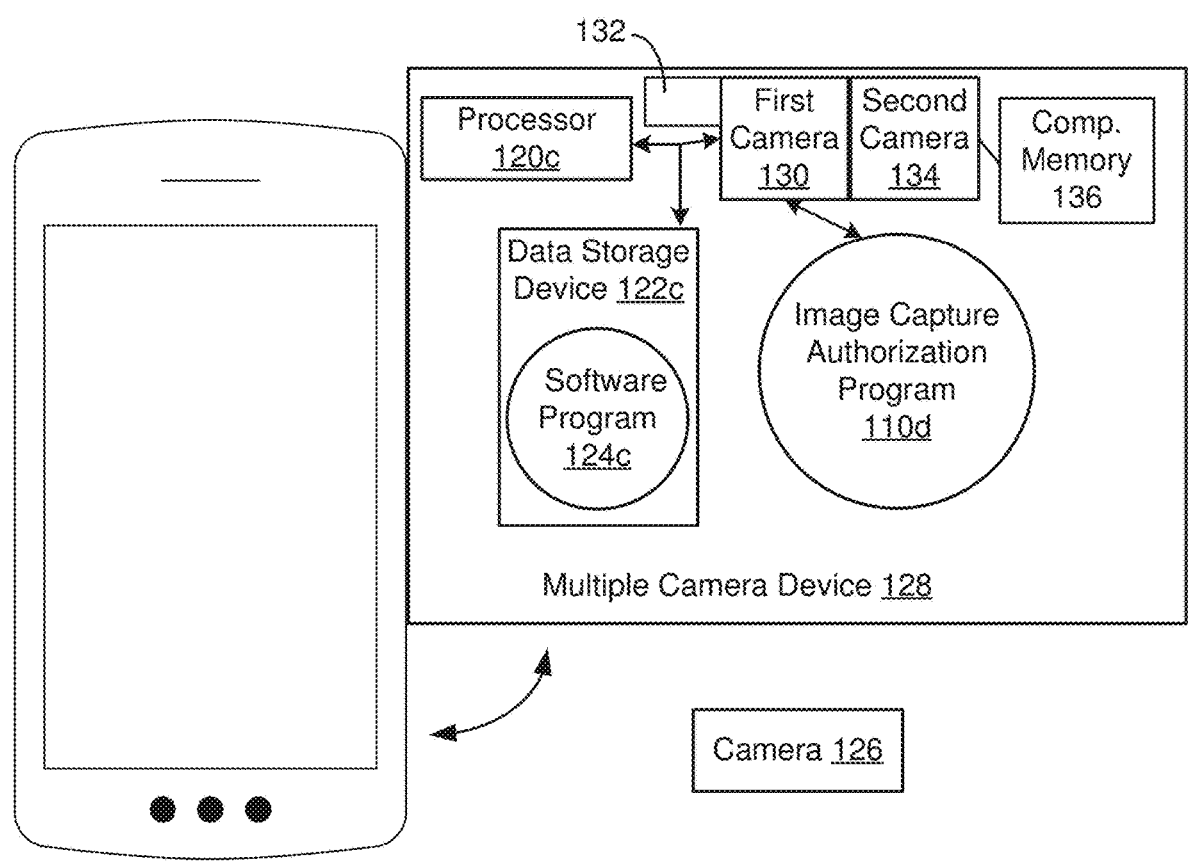
FIG. 1C illustrates some components of an alternate mobile device that may be used in the networked computer environment of FIG. 1A and that may according to at least one embodiment be used to perform the process shown in FIG. 2.

The multiple camera device 128 shown in FIG. 1C may be used similarly as the personal camera device 108 described above to carry out image capture authorization. Unique components of the multiple camera device 128 will be described subsequently.

The personal camera device 108 and the multiple camera device 128 may each be any computer device which also includes a camera, e.g., a digital camera and/or a video camera. The personal camera device 108 may be, for example, a mobile device, a telephone, a personal digital assistant, a netbook, a laptop computer, a tablet computer, a desktop computer, or any type of computing devices that has a camera that is capable of capturing an image, and that is capable of running a program. The personal camera device 108 may additionally be a computing device that is capable of accessing a network and accessing a database 114 in a server 112 that is remotely located with respect to the personal camera device 108. The multiple camera device 128 requires multiple cameras, e.g., two cameras.

According to various implementations of the present embodiment, the image capture authorization program 110a, 110b, 110c, 110d may interact with a database 114 that may be embedded in various storage devices, such as, but not limited to various computers/mobile devices, a server 112 that may be in a network, or another cloud storage service. The database 114 may hold a collection of hallmarks and authorization information associated with each of the hallmarks.

A user/consumer holding the personal camera device 108 may wish to use the camera 126 of the personal camera device 108 to capture a copy of the cat photo 104 that is being displayed on a screen of the general computer 102. The image capture authorization program 110c disposed on the personal camera device 108 may identify and/or recognize the hallmark, e.g., the first visible hallmark 106, on the cat photo 104 and prevent image capture and/or image usage until a check with a hallmark database is carried out and authorization is received. The image capture authorization program 110c will transmit a message to memory, e.g., the other data storage device 122b, disposed in the personal camera device 108 or to the image capture authorization program 110a and the database 114 that are disposed in the server 112 that is remote from the personal camera device 108. For the transmission to the internal memory, in this embodiment a local instance of a hallmark database may be stored within the personal camera device 108 itself. The image capture authorization program 110a in the server 112 (or the image capture authorization program 110c in the personal camera device 108 itself) may check the database for the hallmark that was identified. This checking may ascertain image protection characteristics desired by the owner of the cat photo 104. This checking may indicate that the owner does not want copies, e.g., any copies, of the cat photo 104 to be made. When the owner has registered this restriction with the hallmark database, upon an inquiry a response message may be generated and transmitted back to the image capture authorization program 110b in the personal camera device 108 to indicate that the image capture and/or image usage should be prevented and/or prohibited. Message transmission between the personal camera device 108 and the server 112 may occur via the communication network 116.

A computer system with the image capture authorization program 110a, 110b, 110c, 110d operates as a special purpose computer system in which the image capture authorization process 200 assists in determining whether image capture is authorized. In particular, the image capture authorization program 110a, 110b, 110c, 110d transforms a computer system into a special purpose computer system as compared to currently available general computer systems that do not have the image capture authorization program 110a, 110b, 110c, 110d.

Figure 2:
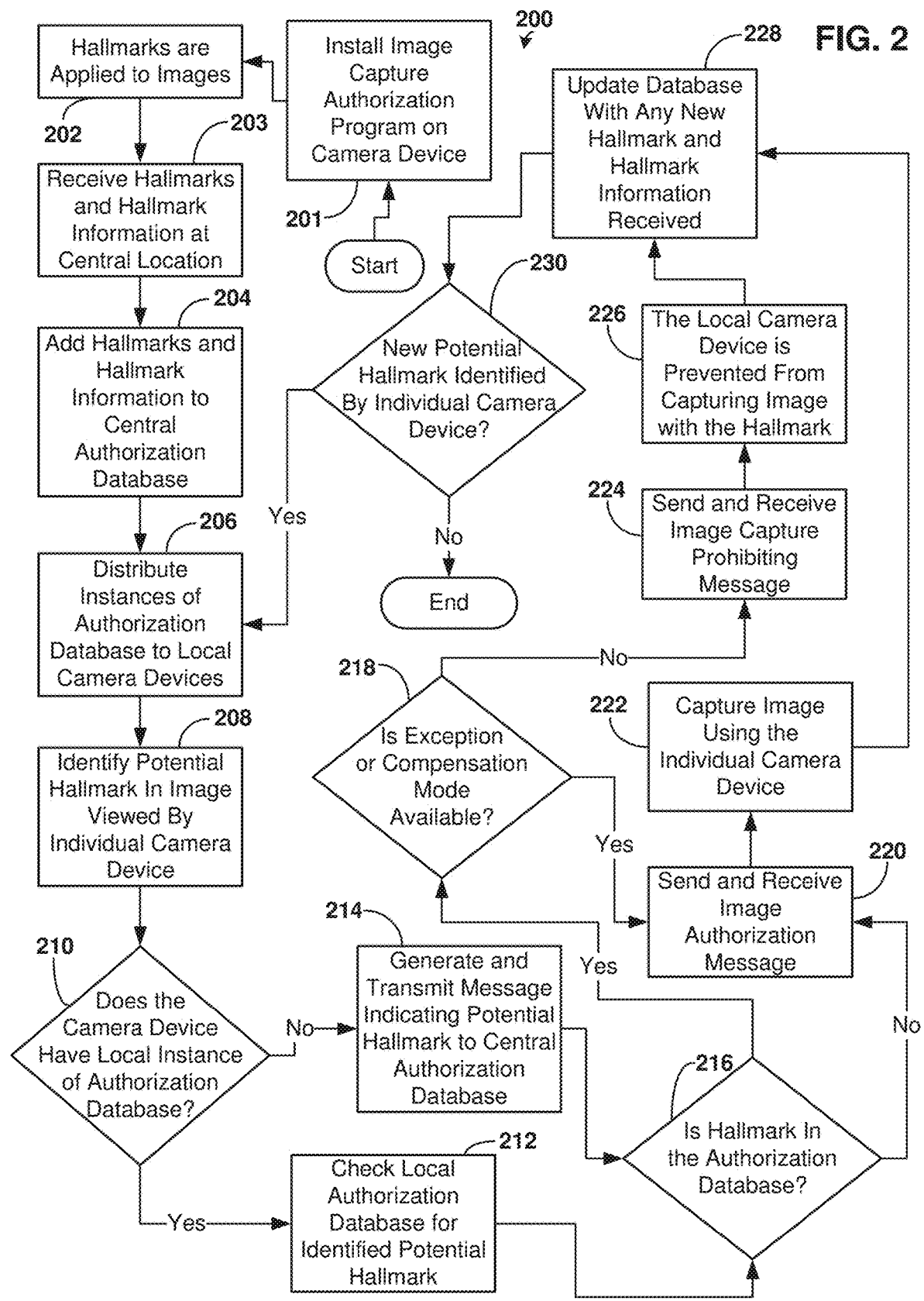
FIG. 2 is an operational flowchart illustrating an image capture authorization process according to at least one embodiment.

Referring now to FIG. 2, an operational flowchart depicts an image capture authorization process 200 that may, according to at least one embodiment, be performed using the image capture authorization program 110a, 110b, 110c, 110d. The image capture authorization program 110a, 110b, 110c, 110d may include various modules, user interfaces, computer memories, and services and may use data storage in the computer memories when the image capture authorization process 200 is performed.

In a step 201 of the image capture authorization process 200, the image capture authorization program is installed on a camera device. FIG. 1B shows an example of the results of step 201 in that the personal camera device 108 includes the image capture authorization program 110c installed thereon.

This installation may occur as part of an installation of initial operating software for the particular camera device, e.g., a cell phone with a camera. For example, an operating system may be designed so that the image capture authorization program is implemented as a fundamental and/or required feature of their operating system.

This installation may also occur as part of a subsequent download of software for an already functioning camera device. In this embodiment, a user may find the image capture authorization program in an app store and download the image capture authorization program for various reasons such as seeking to give greater privacy to others and/or to better respect the copyrights of others.

In some instances, a photo-displaying website, e.g., a social media website, may intermingle the image capture authorization program as a part of their website software. Thus, when a mobile device user installs on the mobile device the mobile app for the website, this image capture authorization program may thereby be installed on the mobile device along with the mobile app. In this embodiment, the image capture authorization program may operate as a plug-in to the website app software.

The camera device such as the personal camera device 108 may receive this installation of step 201 via a data transmission that occurs via a network such as the communication network 116.

In a step 202 of the image capture authorization process 200, hallmarks are applied to images. Various hallmarks may be implemented for the step 202 and for the image capture authorization process 200. The hallmarks may be generated by altering certain pixels of a respective image, with the thereby altered pixels themselves constituting a hallmark. The hallmarks may include visible watermarks. The hallmarks may include watermarks that are invisible to a naked human eye but which are visible to a camera or to certain cameras. Other symbols or reference characters may be added to less-conspicuous locations in the image to serve as one or more hallmarks.

A hallmark may be specific to each website which displays pictures/images/videos and which allows users to upload pictures/images/videos for their display thereon. For example for a website "W" which allows photo uploads and a display of the photos, the website may apply a visible mark "W" in an upper right corner of each photo displayed.

In the example shown in FIG. 1A, a hallmark applied to the cat photo 104 is shown as a first visible hallmark 106 in a lower right corner of the cat photo 104. In this example, the first visible hallmark 106 is a group of three asterisk symbols ("***") arranged horizontally in a row.

In some instances an encoder may be used to apply a hallmark to an image. The image capture authorization program 110b on the image owner computer 118 may include an encoder that may apply a hallmark to an image which the image owner uploads to the image capture authorization program 110b.

In a step 203 of the image capture authorization process 200, the hallmarks and hallmark information are received at a central location. These hallmarks may be those that were applied to images in step 202. The central location may be a server such as the server 112 shown in FIG. 1A and which has a central instance of the image capture authorization program 110a. The hallmark information may include an identity indicator of the owner of the image to which the hallmark was applied in step 202. The hallmark information may also include information indicating any scenarios or exceptions when the image owner would permit and/or authorize their images to be captured by others. The hallmark information may also include a quantity of images that have a respective hallmark, a list of the images that have a respective hallmark, and the world wide web locations, e.g., a URL address, for the respective photo corresponding to each of the hallmarks. Step 203 may include a transmission of data via the communication network 116 in order for the central location to receive the hallmark and the hallmark information.

This transmission for step 203 may occur after an application of the hallmark. For example, in the example shown in FIG. 1A the image capture authorization program 110b on the image owner computer 118 may send a hallmark message to the image capture authorization program 110a on the server 112 in response to the first visible hallmark 106 being applied to the cat photo 104. This hallmark message may include information that describes the appearance of the hallmark, the type of the hallmark, the location of the hallmark in the new photo, the type of the photo, etc. This hallmark message may include a copy of the hallmark itself. In some instances, the hallmark message may even include a copy of the affected photo, e.g., a compressed file of the photo. The hallmark message may also include the identity of the owner of the photo. If the owner has never registered a photo before at the central location, the identity of this owner may be added to the database of the central location. If the owner has previously registered with the central location, the hallmark information for this message may be added to the hallmark profile stored for this owner.

The registration of a photo owner at the central location may include the photo owner providing photo usage authorization preferences that may be stored at the central location. These preferences may include an indication whether the owner would like to allow image capture authorization in exchange for monetary compensation from those who capture the image. These preferences may include an indication whether and in what circumstances the owner would authorize a fair use image capture without requiring any monetary compensation. The image capture authorization program 110a at the central location may generate a registration graphical user interface to be transmitted via the communication network 116 to a photo owner registrant. Via this graphical user interface the image capture authorization program may obtain this information and identity information from the photo owner. The identity information may in some instances include the photo owner choosing a username and password for accessing the image capture authorization central database.

In a step 204 of the image capture authorization process 200, the hallmarks and the hallmark information are added to a central authorization database. These hallmarks and the hallmark information may be those that were received in step 203.

The database 114 shown in FIG. 1A that is part of the server 112 and is accessible by the image capture authorization program 110a of the server 112 may be the central authorization database or may be a part of a distributed central authorization database. The central authorization database may include multiple databases on multiple servers that are connected to each other in a wired or wireless manner.

In some instances, one or more websites that display images with hallmarks that are stored according to step 204 may each host their own image capture authorization server. Such website-specific image capture authorization server may include a respective instance of the image capture authorization program and a respective database for tracking images saved, image owners and their authorization preferences, images marked with the hallmark, additional hallmark information, etc. Thus, the destination for an authorization message seeking authorization for image capture may depend on a content of the hallmark that is applied and subsequently identified as will subsequently be explained.

In a step 206 of the image capture authorization process 200, instances of the authorization database may be distributed to local camera devices. This authorization database may refer to the central authorization database to which the hallmarks and hallmark information were added in step 204. The local camera devices may include the personal camera device 108 that is shown in FIGS. 1A and 1B. This distribution may be considered a pre-loading of hallmark information onto the local participating devices. This distribution of step 206 may occur via a data transfer using the communication network 116 that is shown in FIG. 1A, for example from the image capture authorization program 110a at the server 112 to the image capture authorization program 110c at the personal camera device 108.

In a step 208 of the image capture authorization process 200, a potential hallmark in an image viewed by an individual camera device is identified. This individual camera device is a device on which the image capture authorization program has been installed as was described above in step 201.

This viewing of step 208 at the individual camera device may occur before a full image of the photo with the hallmark is captured by the individual camera device. This identification of step 208 may occur as a part of pre-processing that is performed by a camera device which is activated, is in a camera mode, and has light entering its lens. Other pre-processing steps that are performed by a camera device may vary depending on the model and/or camera mode entered such as a portrait mode, a focus mode, etc. and may include recognizing a focal point, e.g., a person, of a potential image, performing auto-focus, etc.

The image capture authorization program 110c may include a decoder to decode any potential digital watermark that is in the initial image file and is a potential hallmark to be checked in the database.

For the example shown in FIG. 1A, this step 208 may occur when the personal camera device 108 is brought into the vicinity of the general computer 102 and has light from the screen of the general computer 102 showing the cat photo 104 including the first visible hallmark 106 entering into a light chamber of the personal camera device 108. The personal camera device may as a part of pre-processing for an image to be captured may capture the light with an electronic image sensor such as a charge-coupled device (CCD) or a complementary metal oxide semiconductor (CMOS) sensor. This identification and analysis of step 208 may occur continuously when the camera and camera mode are activated and without a specific image capture button, e.g., a click button, being actuated that typically occurs for capturing a photo with a camera.

For a camera with the image capture authorization program stored thereon such as the personal camera device 108 with the image capture authorization program 110c, this search for potential hallmarks may occur continuously when the device and its camera mode have been turned on and without the image capture button being actuated, e.g., without the image capture button being clicked. Although a primary intent for the image capture authorization process 200 is to protect against unauthorized image capture of images being displayed on a computer screen, e.g., a screen of another mobile device, laptop, tablet, desktop computer screen, etc., the image capture authorization program 110c may not recognize whether the camera is in front of a device screen, in front of another work of art, or in front of some other scene which includes real-life objects. Thus, the scanning for hallmark identification of step 208 may occur continuously. As marks in real paintings or real-life objects will likely not have any hallmark identified in step 208, and because a stray mark that is misinterpreted as a hallmark will not have a hallmark match in the central authorization database, the continuous scanning of the camera has minimal or negligible interference with normal image capture being carried out by the local camera device that has the image capture authorization program installed thereon.

This step of 208 may also include the generation of a raw image file and/or another electronic image sensor output that is stored in a compartmented memory area of the personal camera device. This compartmented memory area may be completely private to the operating system. Due to this location and connection of the compartmented memory area, a standard user will not succeed or have knowledge to gain access to any file stored therein such as the raw image file and/or another electronic image sensor output.

As part of step 208, the image capture authorization program 110c may perform image analysis on the raw image file and/or on image information received by the electronic image sensor. The image analysis may detect whether a hallmark is appearing in the current viewpoint of the personal camera device 108. This image analysis may in some respects be analogous to how devices such as cell phones may recognize and scan QR codes.

The image capture authorization program 110c may include a machine learning model that is trained to identify potential hallmarks. This machine learning model may be trained in a supervised manner by inputting a variety of photos with hallmarks applied thereto. This training to an algorithm to produce the machine learning model may occur before the image capture authorization program 110c is installed on the personal camera device 108. The machine learning model may be a mobile machine learning model that is also an inference-based machine learning models such as TensorFlow® Lite (TensorFlow® and all TensorFlow®—based trademarks and logos are trademarks or registered trademarks of Google, Inc. and/or its affiliates).

Image analysis for step 208 may occur by inputting the raw image file and/or some output from an electronic image sensor into the machine learning model and receiving as output a determination of the machine learning model. The determination may be no potential hallmark identified or a potential hallmark identified. For a determination that a potential hallmark was identified, the machine learning model may also as output provide a potential hallmark type/classification of the potential hallmark.

In a step 210 of the image capture authorization process 200, a determination is made whether the camera device has a local instance of the authorization database. The local instance may be one that was distributed in step 206. This camera device refers to the individual camera device by which the potential hallmark in the image was viewed in step 208. If the determination of step 210 is affirmative that this camera device has a local instance of the authorization database, then the image capture authorization process 200 may proceed from step 210 to step 212. If the determination of step 210 is negative and the camera device does not have a local instance of the authorization database, then the image capture authorization process 200 may proceed from step 210 to step 214. Step 210 may be performed by the image capture authorization program 110c analyzing memory such as the other data storage device 122b associated with the image capture authorization program 110c of the personal camera device 108 to determine contents of the memory and searching in those contents for a hallmark database and/or an image capture authorization database.

In a step 212 of the image capture authorization process 200, the local authorization database is checked for the identified potential hallmark. This local authorization database is for this embodiment the local hallmark authorization database disposed on the local camera device such as the personal camera device 108 shown in FIGS. 1A and 1B. This identified potential hallmark may be that potential hallmark that was identified in step 208 and that was seen from the camera view of the camera 126 of the personal camera device 108. The image capture authorization program 110c may perform image and text comparison to search the database. The image capture authorization program 110c may transmit a message internal to the personal camera device 108 to the local authorization program to actuate the database search. In instances when the machine learning model also as output provided a classification of a particular type of the hallmark, the type identified may be added to the hallmark data as a text label. The searching may also include text comparison to reduce and focus the database search to those hallmarks of a matching type. The use of the local authorization database may improve the speed of authorization response from the image capture authorization program 110c to a user desiring to obtain authorization to capture a photo.

In a step 214 of the image capture authorization process 200, a message indicating the potential hallmark is generated and transmitted to the central authorization database. This potential hallmark may be the potential hallmark that was identified in step 208. In the networked computer environment 100 shown in FIG. 1A, this transmission of step 214 may occur via the personal camera device 108 sending a message via the communication network 116 to a remote server, e.g., the server 112, in the cloud, and internally received by an authorization program in that server, e.g., received by the image capture authorization program 110a installed in the server 112. The message may be transmitted to a server associated with the hallmark that was identified, e.g., to a website-specific authorization server. In this instance, the image capture authorization program 110c at the personal camera device 108 may include a smaller database of website-specific addresses corresponding to website-specific hallmarks. Thus, if a website-specific potential hallmark is identified in step 208, the personal camera device 108 may know where to send the message that includes the hallmark and hallmark information and that requests authorization for capture of an image. The message may include the type of hallmark, the actual hallmark itself, a location of where the hallmark was seen in a potential image, and/or in some instances the potential image itself, e.g., in a compressed file. The use of the central authorization database may improve the accuracy of the authorization response from the image capture authorization program 110a, 110c to a user desiring to capture a photo, because the central authorization database is more likely to have a more up-to-date version of the database including any new hallmarks/registrants/photos recently received.

In step 216 of the image capture authorization process 200, a determination is made whether the hallmark is in the authorization database. This determination may be made in the local authorization database as follows with the branch through step 212 or may be made in the central authorization database as follows with the branch through step 214. If the determination of step 216 is affirmative that the hallmark is in the authorization database, then the image capture authorization process 200 proceeds from step 216 to step 218. If the determination of step 216 is negative and the hallmark is not in the authorization database, then the image capture authorization process 200 proceeds from step 216 to step 220. Image and text comparison may be performed to search the database to carry out step 216.

In some embodiments, the determination of step 216 may be accepted as an affirmative when a match confidence is higher than a pre-determined confidence threshold, e.g., for a match confidence of 90% that is higher than an 85% confidence threshold. In some embodiments, when a match confidence for a potential hallmark meets a mid-range of confidence but not a high range of confidence for a match with a hallmark in the database, a notification message requesting confirmation may be generated and transmitted to the hallmark owner who registered the hallmark with the database. For example, in the embodiment shown in FIG. 1A the image capture authorization program 110a at the server 112 may generate and transmit via the communication network 116 a notification message to the image owner computer 118 asking whether the potential hallmark indeed is the hallmark that was applied to the image of the image owner. The hallmark owner may see the potential match and give confirmation which the image capture authorization program may then use for the determination of step 216 or may use as feedback for improving the comparison program and/or the machine learning model that was described above with respect to step 208. A confirmation response message may for example be transmitted from the image owner computer 118 via the communication network 116 back to the image capture authorization program 110a adjacent to the database 114 at the server 112.

In step 218 of the image capture authorization process 200, a determination is made whether an exception or a compensation mode is available. This step 218 occurs when an affirmative match was determined for step 216. This determination may be made by analyzing hallmark information stored for the respective hallmark that was identified in step 208 and which has been found in the authorization database. This hallmark information may include hallmark owner preferences about allowing, permitting, and/or authorizing image capture of their owned image. If the determination of step 218 is affirmative that an exception or a compensation mode is available, then the image capture authorization process 200 proceeds from step 218 to step 220. If the determination of step 218 is negative and no exception and no compensation mode are available, then the image capture authorization process 200 proceeds from step 218 to step 224.

Exceptions may occur for a particular hallmark so that image capture would be authorized despite the hallmark being in the central authorization database. Exceptions may be based, for example, on a hallmark owner of a logo hallmark allowing pictures to be taken of the logo and used for personal use. Other exceptions may be based on a person capturing with their camera their own photo that they uploaded to the website on a previous occasion. Other exceptions may be based on the image owner allowing the photo to be captured with the personal camera and used for personal use, e.g., based on approval of the identity of the person seeking authorization e.g., the person seeking authorization is known by the hallmark owner.

Also if a user and the image owner are both willing to allow an exchange of money for the right to capture the image, the image capture authorization program 110a, 110b, 110c may facilitate such monetary exchange, e.g., for the right to capture the image of the cat photo 104 with the personal camera device 108.

If step 218 indicates that there is a possibility of an exception, the image authorization program 110a, 110c may seek to determine what the intended use of the image capture would be before deciding whether to grant authorization. In this embodiment, a response message may be generated and sent to the local camera device, e.g., from the image authorization program 110a at the server 112 to the image authorization program 110c at the personal camera device 108. The response message may request this information. The message may be displayed on a screen of the local camera device, e.g., of the personal camera device 108, and may include a graphical user interface that solicits a response from the user of the local camera device. The user may answer and actuate the response using input devices of the local camera device, e.g., a touchscreen of the local camera device. This answering and response may trigger the generation and sending of an exception message which may travel back to the image capture authorization program 110a at the central authorization database, e.g., at the server 112. After receiving, reviewing, and analyzing details about the intended usage, the image capture authorization program 110a, 110c may then send an answer message back to the local camera device, e.g., to the personal camera device 108. The answer message may indicate whether image capture is authorized via a granted exception. For this embodiment the answer message may be part of the step 220 which is to be described below.

In step 220 of the image capture authorization process 200, an image authorization message is sent and received. This step 220 is performed in response to a determination that the particular hallmark was not located in the authorization database in step 216 or is performed in response to a determination that an exception or compensation mode is available in step 218 and is granted. This message may be sent within a local camera device such as the personal camera device 108 shown in FIGS. 1A and 1B if the personal camera device 108 hosts a local instance of an authorization database. The message may be sent from the local instance of the authorization database and may be received by the image capture authorization program 110c which may display this message on a screen of the personal camera device 108. This message may be additionally or alternatively be sent from a central authorization database in a remote server such as the server 112 shown in FIG. 1A and be received by a local camera device such as the personal camera device 108 shown in FIGS. 1A and 1B if the personal camera device 108 does not host a local instance of an authorization database. The communication network 116 shown in FIG. 1A may be used for this data transmission from a remote server as a part of step 220.

For instances when an exception was authorized, the image authorization message may include information explaining what types of usage for the to-be-captured image would be deemed acceptable. For instances when a compensation mode was assigned and available, the image authorization message may include information about providing the compensation, e.g., a price and accepted payment methods.

In step 222 of the image capture authorization process 200, an image is captured using the individual camera device. In the embodiment shown in FIG. 1A, the personal camera device 108 may utilize the camera 126 to capture an image of the cat photo 104. A visible hallmark such as the first visible hallmark 106 may be captured along with the image captured in step 222. This step 222 is performed in response to the image authorization message being sent and received in step 220.

With this approval, the actuation of the photo capture actuation button on the local camera device, e.g., on the personal camera device 108 shown in FIGS. 1A and 1B, may generate an image file that may be sent to a memory card or other user-accessible memory of the personal camera device 108. This image file transfer to the memory card and/or to other user-accessible memory may allow post-processing of a raw image to occur.

In step 224 of the image capture authorization process 200, an image capture prohibiting message is sent and received.

This message may be sent within a local camera device such as the personal camera device 108 shown in FIGS. 1A and 1B if the personal camera device 108 hosts a local instance of an authorization database. The message may be sent from the local instance of the authorization database and may be received by the image capture authorization program 110c which may display a "no authorization" message on a screen of the personal camera device 108.

This message may be additionally or alternatively be sent from a central authorization database in a remote server such as the server 112 shown in FIG. 1A and be received by a local camera device such as the personal camera device 108 shown in FIGS. 1A and 1B if the personal camera device 108 does not host a local instance of an authorization database. The communication network 116 shown in FIG. 1A may be used for this message/data transmission from a remote server as a part of step 224.

In step 226 of the image capture authorization process 200, the local camera device is prevented from capturing the image with the hallmark. In the example shown in FIGS. 1A and 1B the image capture authorization program 110c of the personal camera device 108 may prevent and prohibit the capture of the cat photo 104 with the hallmark. Step 226 may be performed by the image capture authorization program 110c at the personal camera device 108 disabling the camera click button of the camera 126 while the camera view is showing the photo with the hallmark. Step 226 may alternatively be performed by the image capture authorization program 110c sending a dumping/emptying command for the image file cache to be dumped and/or emptied which held the raw image file of the photo with the hallmark. This dumping command may occur in conjunction with the generation and display of an "image capture not authorized" on the display screen of the local camera device. This embodiment with the dumping command may occur after the image capture button was actuated by the camera user.

Any raw image file that was captured for the hallmark identification in step 208 may not be of use for the user for image capture and display on the personal camera device 108, as this raw image file may be disposed in the memory that is private to the operating system and inaccessible to a standard camera user. In some embodiments the image capture prevention of step 226 may also include dumping the cache of a raw image file from the inaccessible memory portion.

In some embodiments, the image capture will be allowed despite the receipt of the no authorization message from step 224. Instead of image capture prevention, a display message may be generated and displayed that capture of this image is not authorized by the image owner. In some embodiments, a "not authorized" message may be imprinted into the captured image file so as to be visible when the captured image that was captured without authorization is displayed.

In an alternative local camera device shown in FIG. 1C a multiple camera device 128 that may be used to perform the image capture authorization process 200 is shown. This multiple camera device 128 is one example of a structure which may be used to help perform the image capture authorization process 200 including the image capture prevention for step 226. The multiple camera device 128 may include a further processor 120c and a further data storage device 122c that may store a further software program 124c. The multiple camera device 128 may also include the image capture authorization program 110d installed thereon. The installation of the image capture authorization program 110d to the multiple camera device 128 may occur in step 201 of the image capture authorization process 200.

The multiple camera device 128 may include a first camera 130 and a second camera 134. The first camera 130 and the second camera 134 may each include their own respective electronic image sensor such as a charge-coupled device (CCD). The second camera 134 may be involved in the previously-described step 208 where a potential hallmark is identified. While the view of the first camera 130 may be displayed on a display screen of the multiple camera device 128 to allow a user to prepare for a desired image capture, the view of the second camera 134 may in some embodiments not be connected to a display screen. Thus, the second camera 134 works in conjunction with the image capture authorization program 110d exclusively to assist with the image capture authorization process and not for direct personal photography use by the camera user. A lens of the first camera 130 may be disposed on the housing of the multiple camera device 128 in a position that is adjacent to a position of a lens of the second camera 134. This adjacent positioning may help increase the amount of overlap between the camera (lens) view of the first camera 130 and the camera (lens) view of the second camera 134. An increased overlap will help improve the consistency of the second camera 134 identifying an image with a hallmark that is also in view of the first camera 130.

The second camera 134 may produce a raw image file or other electronic image sensor output which is sent to a compartmentalized memory 136 that is private to the operating system of the multiple camera device 128 and that is inaccessible to a regular user of the multiple camera device 128. Thus, a raw image file saved in the compartmentalized memory 136 is not available to the user for display, transfer, and/or post-processing. Image analysis may be performed via the image capture authorization program 110d on the raw image produced by image capture from the second camera 134. If the machine learning model of the image capture authorization program 110d on the multiple camera device 128 determines that the second camera is capturing an image with a potential hallmark thereon, the image capture authorization program 110d may transmit the message of step 214 or perform the check of the local authorization database for 212 to determine if the potential hallmark is in the authorization database. A transceiver of the multiple camera device 128 may send the hallmark message to the central authorization database.

The first camera 130 of the multiple camera device 128 may be blocked via a blocker 132 when the second camera 134 currently has in view an image with a potential hallmark therein. If the step 220 is performed so that the multiple camera device 128 receives authorization to capture an image that is being shown on a screen of a computer, the image capture authorization program 110d disables the blocker 132 so that the first camera 130 may according to step 222 take the image when a user actuates the camera click or actuation button. If step 224 occurs so that image capture is not authorized, the image capture authorization program 110d may activate the blocker 132 so that the first camera 130 is disabled from taking a picture while the image with the hallmark is in the view of the first camera 130. The first camera 130 saves its image files to a standard memory card or other standardly-accessible memory portion of the computer of the multiple camera device 128 so that these images may be accessed, displayed, transferred, post-processed, etc.

The blocker 132 may in some embodiments apply a current, voltage, and/or heat to the lens of the first camera 130 that may disable the lens. The blocker 132 may include a thermochromic material, a photochromic material, and/or an electrochromic material which changes light transmission abilities based on various inputs received. The blocker 132 may include a liquid crystal device which changes light transmission abilities based on various inputs received such as a control signal from the image capture authorization program 110d.

The blocker 132 may in some embodiments be a physical cover which blocks the lens of the first camera 130 during the activation of the blocker 132. The blocker 132 may be a pivoting or sliding cover connected to a housing of the camera. A control signal from the image capture authorization program 110d may control a positioning and movement of the blocker 132 based on signals received from the first camera 130 and from the database authorization check. For example, an authorization signal may cause the blocker 132 to pivot and/or slide out of the light path of the lens. A non-authorization signal may cause the blocker 132 to pivot and/or slide into the light path of the lens. to block the first camera 130.

The blocker 132 may in some embodiments experience a change in its ability to transmit light based on the control signal from the image capture authorization program 110d. For example, the blocker may change from being opaque, translucent, or clear depending on a control signal received. The control signal may cause the blocker 132 to produce a current, voltage, and/or heat to affect the light transmission properties.

It should be appreciated that FIG. 1C provides only illustration of one implementation and does not imply any limitations with regard to the physical components used for implementing the different embodiments. Many modifications to the depicted components may be made based on design and implementation requirements.

In step 228 of the image capture authorization process 200, the authorization database is updated with any new hallmark and hallmark information received. A steady stream of new registrants, new hallmarks, and/or new photos to protect may be received by the central hallmark authorization database from various users who use and/or have begun to use the image capture authorization program to better protect their photos. The image capture authorization program 110a at the server 112 may receive one or more new instances of hallmarks and/or hallmark information which the image capture authorization program 110a adds to the database 114. Such updates may occur after a new user uses their personal device to download the image capture authorization program onto their respective computer and after the new user registers with the authorization database. Such updates may also occur when already-registered image owners submit newly hallmarked photos for registration in the image capture authorization database.

In step 230 of the image capture authorization process 200, a determination is made whether a new hallmark is identified by an individual camera device. If the determination of step 230 is negative and no new hallmark is identified, the image capture authorization process 200 may proceed to an end of the image authorization process. The image capture authorization process 200 may be repeated, however, subsequently if individual camera devices identify new photos and/or pictures with potential hallmarks. If the determination of step 230 is affirmative that a new potential hallmark is identified by an individual camera device, the image capture authorization process 200 proceeds to step 206 for a repeat of most of the image capture authorization process 200 but performed with respect to the new hallmark identified. The repeat may begin with a repeat of step 206 in order to distribute any updates that were received in step 228 to local authorization databases stored at respective local camera devices.

Hallmark information data that is used during the image capture authorization process 200 may be stored in memory that is part of the image capture authorization program 110a, 110b, 110c, 110d or that is accessible to the image capture authorization program 110a, 110b, 110c, 110d. For example, hallmark and hallmark information may be saved in the database 114 shown in FIG. 1B, in the RAM 308 that is shown in FIG. 3, in memory of a server within and connected to the communication network 116, and/or in other memory in one or more remote servers that is accessible to the image capture authorization program 110a, 110b, 110c, 110d via the communication network 116 and/or via a wired connection.

This image capture authorization process 200 may be implemented in standalone cameras that have the ability to connect to the internet and in personal portable devices that usually include a camera therein. The image capture authorization process 200 may depend on the camera module, rather than on the application which exposes the module. Whatever camera application is used, the image capture authorization program 110a, 110b, 110c, 110d may take care of validating the image and checking for the authorization.

In some embodiments the image capture authorization process 200 may invoke the usage of one or more machine learning models to perform the image capture authorization or prevention. This image capture authorization process 200 may be performed in conjunction and/or cooperation with various social media websites.

It may be appreciated that FIG. 2 provides an illustration of an embodiment and does not imply any limitations with regard to how different embodiments may be implemented. Many modifications to the depicted embodiment(s), e.g., to a depicted sequence of steps, may be made based on design and implementation requirements.

FIG. 3 is a block diagram 300 of internal and external components of computers depicted in FIGS. 1A, 1B, and 1C in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 302a, 302b, 304a, 304b is representative of any electronic device capable of executing machine-readable program instructions. Data processing system 302a, 302b, 304a, 304b may be representative of a smart phone, a computer system, PDA, or other electronic devices. Examples of computing systems, environments, and/or configurations that may represented by data processing system 302a, 302b, 304a, 304b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

General computer 102, the personal camera device 108, the image owner computer 118, the server 112, and the multiple camera device 128 may include respective sets of internal components 302a, 302b and/or external components 304a, 304b illustrated in FIG. 3. Each of the sets of internal components 302a, 302b includes one or more processors 306, one or more computer-readable RAMs 308 and one or more computer-readable ROMs 310 on one or more buses 312, and one or more operating systems 314 and one or more computer-readable tangible storage devices 316. The one or more operating systems 314 and the image capture authorization program 110c in personal camera device 108, the image capture authorization program 110b in image owner computer 118, the image capture authorization program 110d in the multiple camera device 128, and the image capture authorization program 110a in server 112 may be stored on one or more computer-readable tangible storage devices 316 for execution by one or more processors 306 via one or more RAMs 308 (which typically include cache memory). In the embodiment illustrated in FIG. 3, each of the computer-readable tangible storage devices 316 is a magnetic disk storage device of an internal hard drive. Alternatively, each of the computer-readable tangible storage devices 316 is a semiconductor storage device such as ROM 310, EPROM, flash memory, or any other computer-readable tangible storage device that can store a computer program and digital information.

Each set of internal components 302a, 302b also includes a RAY drive or interface 318 to read from and write to one or more portable computer-readable tangible storage devices 320 such as a CD-ROM, DVD, memory stick, magnetic tape, magnetic disk, optical disk or semiconductor storage device. A software program, such as the first, second, and third software programs 124a, 124b, 124c and the image capture authorization program 110a, 110b, 110c, 110d can be stored on one or more of the respective portable computer-readable tangible storage devices 320, read via the respective R/W drive or interface 318 and loaded into the respective hard drive, e.g., the tangible storage device 316.

Each set of internal components 302a, 302b may also include network adapters (or switch port cards) or interfaces 322 such as a TCP/IP adapter cards, wireless wi-fi interface cards, or 3G, 4G, or 5G wireless interface cards or other wired or wireless communication links. The image capture authorization program 110c in personal camera device 108, the image capture authorization program 110b in image owner computer 118, the image capture authorization program 110d in the multiple camera device 128, and the image capture authorization program 110a in the server 112 can be downloaded from an external computer (e.g., server) via a network (for example, the Internet, a local area network or other, wide area network) and respective network adapters or interfaces 322. From the network adapters (or switch port adaptors) or interfaces 322, the image capture authorization program 110c for personal camera device 108, the image capture authorization program 110b for image owner computer 118, the image capture authorization program 110d for the multiple camera device 128, and the image capture authorization program 110a for server 112 are loaded into the respective hard drive, e.g., the tangible storage device 316. The network may include copper wires, optical fibers, wireless transmission, routers, firewalls, switches, gateway computers and/or edge servers.

Each of the sets of external components 304a, 304b can include a computer display monitor 324, a keyboard 326, and a computer mouse 328. External components 304a, 304b can also include touch screens, virtual keyboards, touch pads, pointing devices, and other human interface devices. Each of the sets of internal components 302a, 302b also includes device drivers 330 to interface to computer display monitor 324, keyboard 326 and computer mouse 328. The device drivers 330, RAY drive or interface 318 and network adapter or interface 322 include hardware and software (stored in storage device 316 and/or ROM 310).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
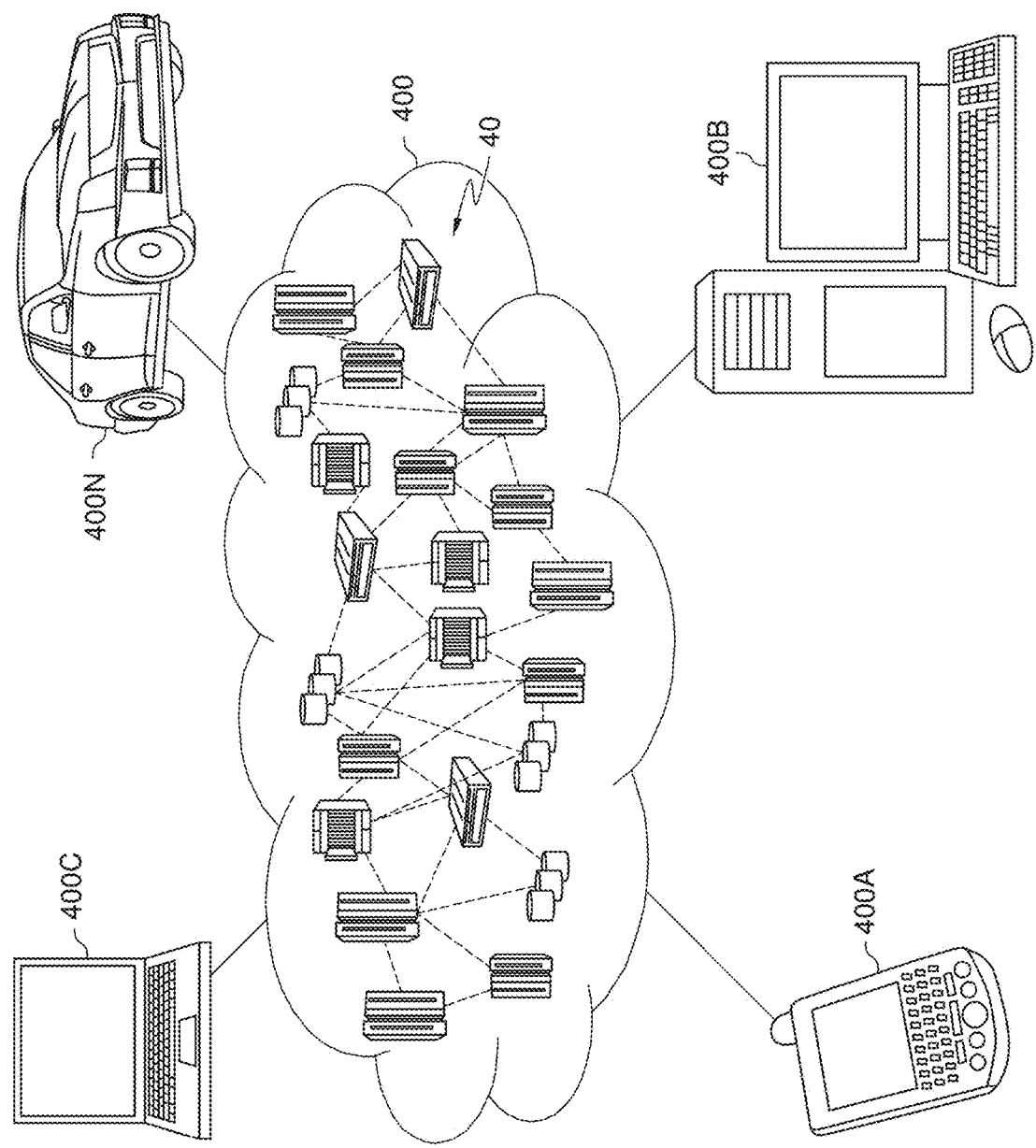
FIG. 4 is a block diagram of an illustrative cloud computing environment including the computer system depicted in FIG. 1A in accordance with an embodiment of the present disclosure.

Referring now to FIG. 4, illustrative cloud computing environment 400 is depicted. As shown, cloud computing environment 400 comprises one or more cloud computing nodes 40 with which local computing devices used by cloud consumers, such as, for example, personal digital assistant (PDA) or cellular telephone 400A, desktop computer 400B, laptop computer 400C, and/or automobile computer system 400N may communicate. Nodes 40 may communicate with one another and may include the individual computers and mobile devices depicted in FIGS. 1A, 1B, and 1C. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 40 and cloud computing environment 400 can communicate with any type of computerized device over any type of network and/or network addressable connection (e.g., using a web browser).

Figure 5:
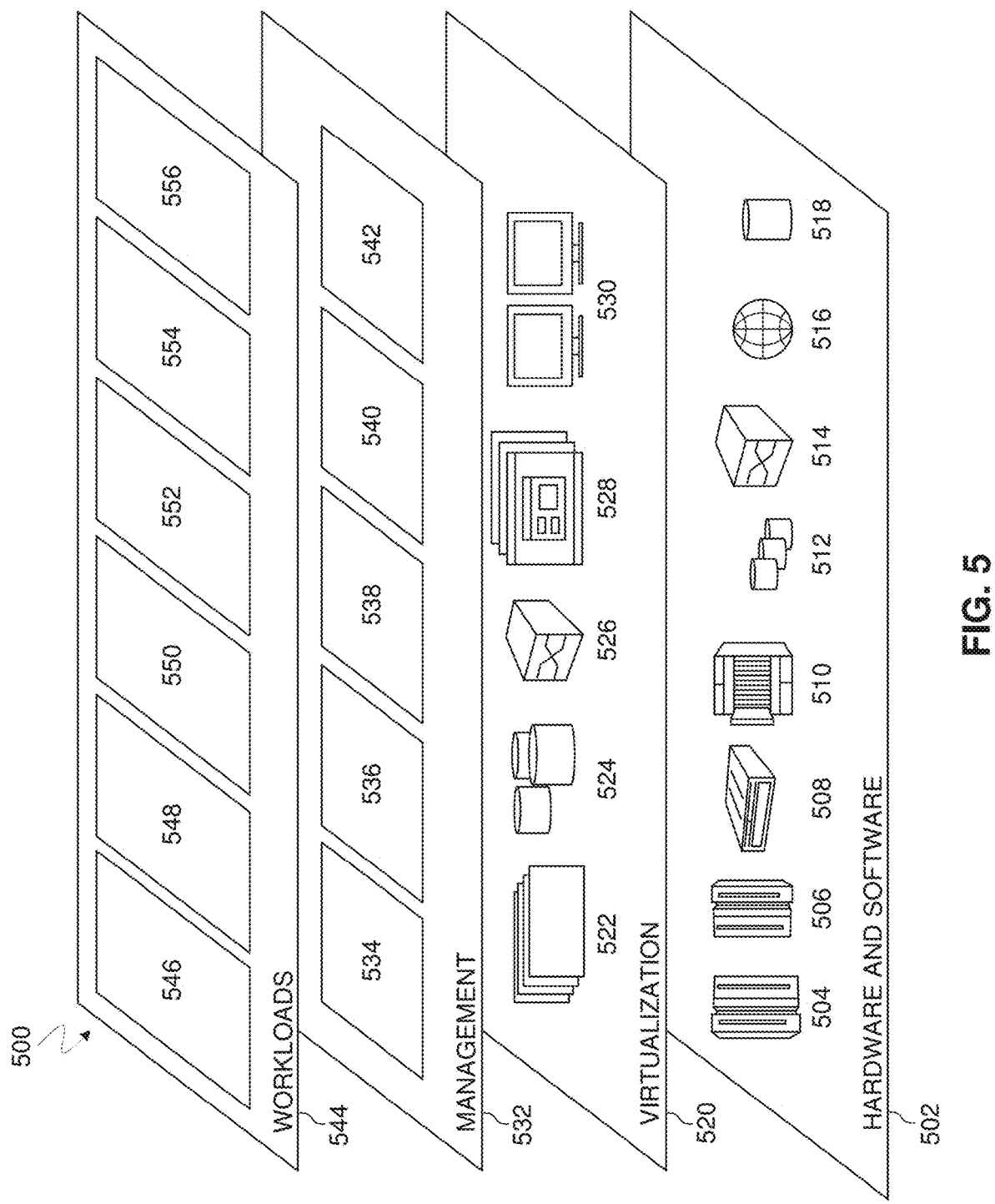
FIG. 5 is a block diagram of functional layers of the illustrative cloud computing environment of FIG. 4 in accordance with an embodiment of the present disclosure.

Referring now to FIG. 5, a set of functional abstraction layers 500 provided by cloud computing environment 400 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 502 includes hardware and software components. Examples of hardware components include: mainframes 504; RISC (Reduced Instruction Set Computer) architecture based servers 506; servers 508; blade servers 510; storage devices 512; and networks and networking components 514. In some embodiments, software components include network application server software 516 and database software 518.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 532 may provide the functions described below. Resource provisioning 534 provides dynamic procurement of computing resources and other resources that are utilized to perform tasks within the cloud computing environment. Metering and Pricing 536 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 538 provides access to the cloud computing environment for consumers and system administrators. Service level management 540 provides cloud computing resource allocation and management such that required service levels are met. Service Level Agreement (SLA) planning and fulfillment 542 provide pre-arrangement for, and procurement of, cloud computing resources for which a future requirement is anticipated in accordance with an SLA.

Workloads layer 544 provides examples of functionality for which the cloud computing environment may be utilized. Examples of workloads and functions which may be provided from this layer include: mapping and navigation 546; software development and lifecycle management 548; virtual classroom education delivery 550; data analytics processing 552; transaction processing 554; and image capture authorization 556. The image capture authorization program 110*a*, 110*b*, 110*c* provides a way for photos and/or videos to be displayed and/or played on the internet without letting unauthorized users capture and/or record the images using an external camera.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for image protection, the method comprising:
   identifying, with a first device comprising a computer and a first camera, a picture having a hallmark;
   transmitting via the first device a message requesting authorization to have a copy of the picture, the message containing data representative of the hallmark;
   receiving, via the first device, a response message; and
   determining via the first device whether the response message authorizes capture of a copy of the picture.

2. The method of claim 1, further comprising:
   in response to determining that the response message does not authorize capture of a copy of a picture, preventing, via the computer, the first camera from obtaining a copy of the picture.

3. The method of claim 2, wherein the preventing the first camera from obtaining the copy of the picture is performed via a dumping of a cache holding an image file.

4. The method of claim 1, further comprising:
   in response to determining that the response message authorizes capture of a copy of a picture, enabling the camera to obtain a copy of the picture.

5. The method of claim 4, further comprising:
   capturing a copy of the picture via the camera.

6. The method of claim 1, wherein a destination of the transmitted message depends on a content of the identified hallmark.

7. The method of claim 1, wherein the hallmark is selected from a group consisting of altered pixels, a visible watermark, and an invisible watermark.

8. The method of claim 1, wherein the message is transmitted to a database stored locally in the first device.

9. The method of claim 1, wherein the message is transmitted to a server that is external to the first device.

10. The method of claim 1, further comprising:
    determining via the first device that the response message solicits exception information;
    generating and transmitting via the first device an exception message that comprises exception information; and
    receiving, via the first device, an answer message; and
    determining, via the first device, whether the answer message authorizes capture of a copy of the picture based on an exception authorized by an owner of the picture having the hallmark.

11. The method of claim 10, wherein the authorized exception is based on a member selected from a group consisting of a fair use exception, a promotional exception, an identity confirmation, and a picture owner approval.

12. A computer system for image protection, the computer system comprising:
    one or more processors, one or more computer-readable tangible storage media, and program instructions stored on at least one of the one or more computer-readable tangible storage media for execution by at least one of the one or more processors to cause the computer system to:
    identify a picture having a hallmark;
    transmit a message requesting authorization to have a copy of the picture, the message containing data representative of the hallmark;
    receive a response message; and
    determine whether the response message authorizes capture of a copy of the picture.

13. The computer system of claim 12, wherein the program instructions further cause the computer system to, in response to determining that the response message does not authorize capture of a copy of a picture, prevent an obtaining of a copy of the picture.

14. A camera device comprising:
    a housing;
    the computer system of claim 12, the computer system being connected to the housing; and
    a first camera connected to the housing;
    wherein the program instructions further cause the computer system to act in response to determining whether the response message authorizes capture of a copy of a picture.

15. The camera device of claim 14, wherein the action is to capture a copy of the picture via the first camera.

16. The camera device of claim 14, wherein in response to the response message not authorizing capture the action is to dump an image file of the picture from cache.

17. A computer program product for resource management, the computer program product comprising a computer-readable storage medium having program instructions embodied therewith and executable by a computer system to cause the computer system to:
    identify a picture having a hallmark;
    transmit a message requesting authorization to have a copy of the picture, the message containing data representative of the hallmark;
    receive a response message; and
    determine whether the response message authorizes capture of a copy of the picture.

18. The computer program product of claim 17, wherein a destination of the transmitted message depends on a content of the identified hallmark.

19. The computer program product of claim 17, wherein the hallmark is selected from a group consisting of altered pixels, a visible watermark, and an invisible watermark.

20. The computer program product of claim 17, wherein the program instructions further cause the computer system to:
    determine that the response message solicits exception information;
    generate and transmit an exception message that comprises exception information;

receive an answer message; and determine whether the answer message authorizes capture of a copy of the picture based on an exception authorized by an owner of the picture having the hallmark.

\* \* \* \* \*